United States Patent
Tice

(10) Patent No.: US 7,881,939 B2
(45) Date of Patent: Feb. 1, 2011

(54) MONITORING SYSTEM WITH SPEECH RECOGNITION

(75) Inventor: Lee D. Tice, Bartlett, IL (US)

(73) Assignee: Honeywell International Inc., Morristown, NJ (US)

( * ) Notice: Subject to any disclaimer, the term of this patent is extended or adjusted under 35 U.S.C. 154(b) by 1131 days.

(21) Appl. No.: 11/141,125

(22) Filed: May 31, 2005

(65) Prior Publication Data
US 2006/0285651 A1 Dec. 21, 2006

(51) Int. Cl.
G10L 21/06 (2006.01)
G10L 21/00 (2006.01)
G10L 19/12 (2006.01)
G08B 1/08 (2006.01)

(52) U.S. Cl. ............ 704/271; 704/270; 704/273; 704/223; 704/275; 340/539.12; 340/539.11; 340/539.14; 340/539.22

(58) Field of Classification Search .......... 704/270; 340/539.22, 539.12, 539.11, 539.14
See application file for complete search history.

(56) References Cited

U.S. PATENT DOCUMENTS

| | | | | |
|---|---|---|---|---|
| 5,564,429 A | 10/1996 | Bornn et al. | ............... | 128/696 |
| 5,626,144 A * | 5/1997 | Tacklind et al. | ............ | 600/538 |
| 5,732,386 A * | 3/1998 | Park et al. | .................. | 704/203 |
| 5,794,219 A | 8/1998 | Brown | ....................... | 705/37 |
| 5,832,448 A | 11/1998 | Brown | ........................ | 705/2 |
| 5,897,493 A | 4/1999 | Brown | ....................... | 600/300 |
| 5,899,855 A | 5/1999 | Brown | ....................... | 600/301 |
| 5,960,403 A | 9/1999 | Brown | ........................ | 705/2 |
| 5,997,476 A | 12/1999 | Brown | ....................... | 600/300 |
| 6,032,119 A | 2/2000 | Brown et al. | ................. | 705/2 |
| 6,050,940 A | 4/2000 | Braun et al. | ................. | 600/300 |
| 6,097,305 A * | 8/2000 | Im et al. | ................ | 340/825.19 |
| 6,101,478 A | 8/2000 | Brown | ........................ | 705/2 |
| 6,161,095 A | 12/2000 | Brown | ........................ | 705/2 |
| 6,166,656 A * | 12/2000 | Okada et al. | ................ | 340/901 |
| 6,167,362 A | 12/2000 | Brown et al. | .................. | 703/11 |
| 6,168,563 B1 | 1/2001 | Brown | ....................... | 600/301 |
| 6,246,992 B1 | 6/2001 | Brown | ........................ | 705/2 |
| 6,248,065 B1 * | 6/2001 | Brown | ....................... | 600/300 |
| 6,270,455 B1 | 8/2001 | Brown | ....................... | 600/300 |
| 6,302,844 B1 * | 10/2001 | Walker et al. | ............... | 600/300 |
| 6,368,273 B1 | 4/2002 | Brown | ....................... | 600/300 |

(Continued)

FOREIGN PATENT DOCUMENTS

WO   WO 01/56019 A1   8/2001

(Continued)

OTHER PUBLICATIONS

Supplementary European Search Report corresponding to European Patent No. EP 06 76 0193, dated Jul. 30, 2010.

*Primary Examiner*—Richemond Dorvil
*Assistant Examiner*—Michael Ortiz Sanchez
(74) *Attorney, Agent, or Firm*—Husch Blackwell LLP Welsh Katz

(57) ABSTRACT

A system for monitoring conditions associated with an individual in a region includes at least one speech input transducer and speech processing software coupled thereto. Results of the speech processing can initiate communications with a displaced communications device such as a telephone or a computer to provide a source of feedback.

40 Claims, 2 Drawing Sheets

U.S. PATENT DOCUMENTS

| | | |
|---|---|---|
| 6,381,577 B1 | 4/2002 | Brown .......................... 705/2 |
| 6,402,691 B1 | 6/2002 | Peddicord et al. ........... 600/300 |
| 6,612,984 B1 | 9/2003 | Kerr, II ....................... 600/300 |
| 6,723,046 B2 | 4/2004 | Lichtenstein et al. ........ 600/300 |
| 2002/0184012 A1* | 12/2002 | Burnett et al. .............. 704/223 |
| 2003/0104800 A1 | 6/2003 | Zak |
| 2003/0179888 A1* | 9/2003 | Burnett et al. .............. 381/71.8 |
| 2004/0066940 A1 | 4/2004 | Amir |
| 2004/0081322 A1* | 4/2004 | Schliep et al. ................ 381/57 |
| 2004/0116842 A1* | 6/2004 | Mardirossian ................. 604/1 |
| 2004/0233045 A1* | 11/2004 | Mays ....................... 340/425.5 |
| 2005/0114127 A1* | 5/2005 | Rankovic .................... 704/233 |
| 2005/0136848 A1* | 6/2005 | Murray ........................ 455/79 |
| 2006/0004581 A1* | 1/2006 | Claudatos et al. ........... 704/275 |
| 2006/0273914 A1* | 12/2006 | Carreras et al. .......... 340/573.1 |

FOREIGN PATENT DOCUMENTS

| | | |
|---|---|---|
| WO | WO 02/075688 A2 | 9/2002 |
| WO | WO 02/075688 A3 | 9/2002 |

* cited by examiner

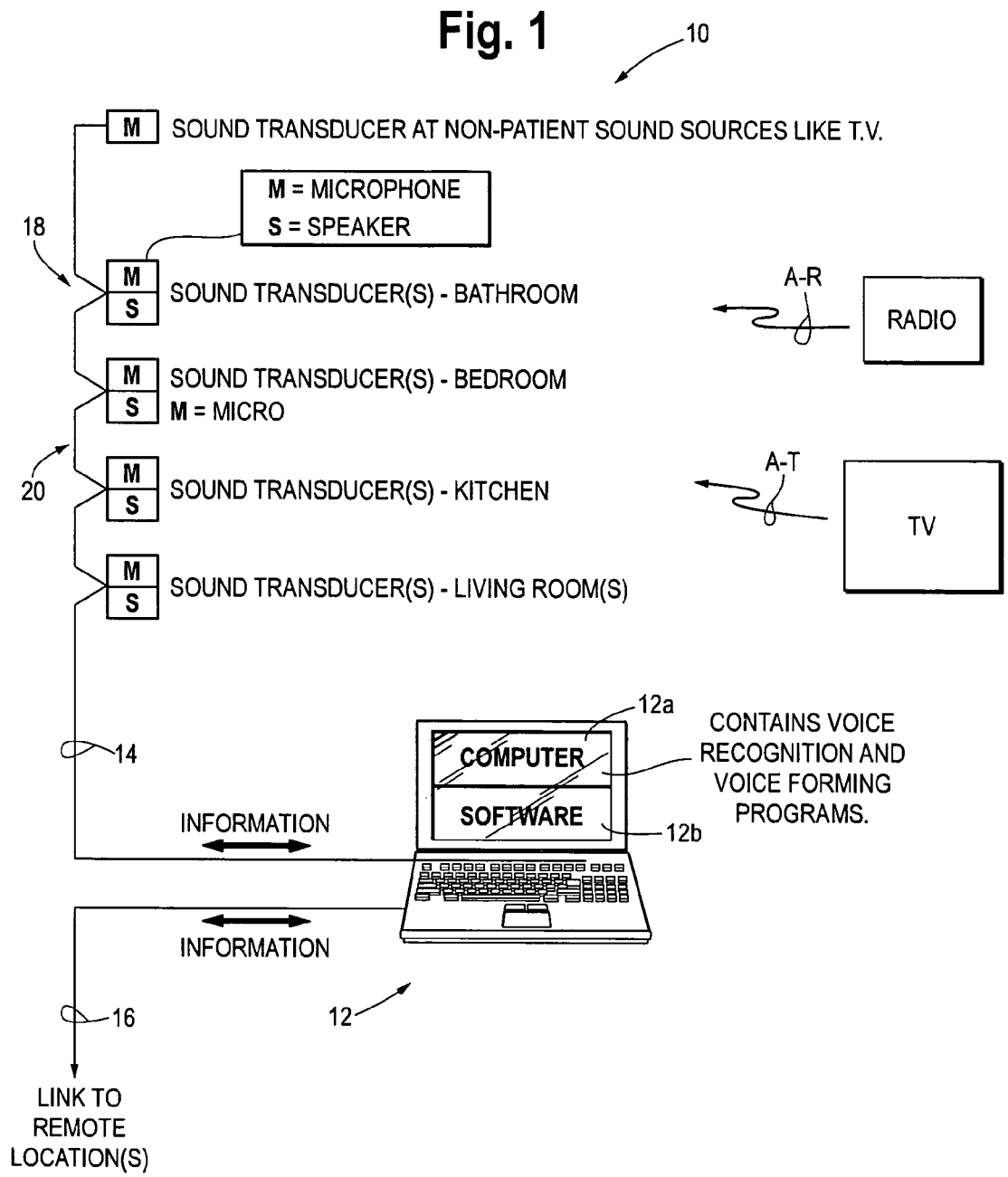

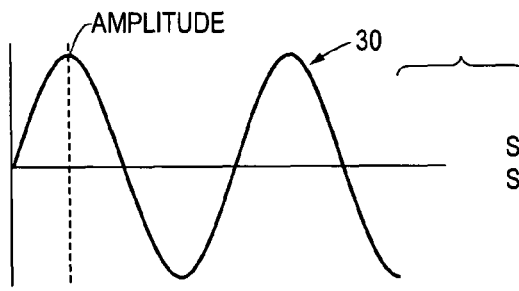

Fig. 2A

SOUND TRANSDUCER AT NON-PATIENT SOURCE LIKE T.V.

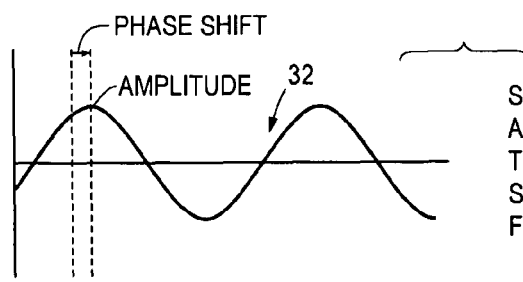

Fig. 2B

SOUND TRANSDUCER SIGNAL AT ANOTHER LOCATION WITH RESPONSE TO SOUND FROM NON-PATIENT SOURCE SHOWING PHASE SHIFT DUE TO DISTANCE FROM NON-PATIENT SOURCE.

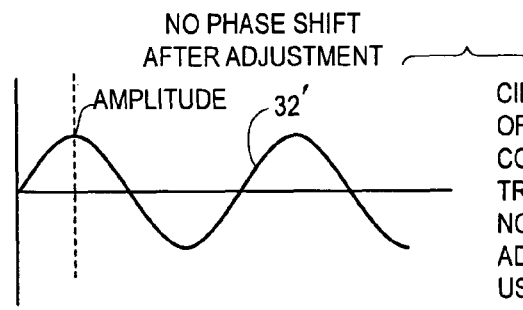

Fig. 2C

CIRCUITRY OR SOFTWARE CHANGES PHASE OF SIGNAL SHOWN IN FIGURE (2B) TO COMPARE AND VERIFY THAT THE SOUND TRANSDUCER SIGNAL IS RELATED TO THE NON-PATIENT SOURCE. THE PHASE IS ADJUSTED AND STORED IN MEMORY FOR USE WITH THIS NOISE SOURCE.

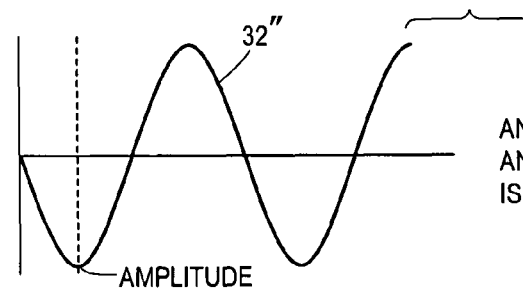

Fig. 2D

AN INVERTED SIGNAL IS FORMED FROM (2C) AND THEN ADJUSTED IN AMPLITUDE SO IT IS THE SAME AS (2A), ONLY OPPOSITE IN PHASE.

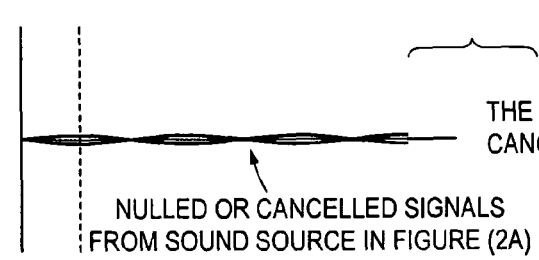

Fig. 2E

THE SIGNAL IN (2A) IS ADDED TO (2D) TO CANCEL THE SIGNAL.

NULLED OR CANCELLED SIGNALS FROM SOUND SOURCE IN FIGURE (2A)

AMBIENT NOISE COMPENSATION FOR A SPECIFIC NON-PATIENT SOUND SOURCE

MONITORING SYSTEM WITH SPEECH RECOGNITION

FIELD OF THE INVENTION

The present invention relates to the remote monitoring of a patient that incorporates the ability of that patient to call for help during emergency situations without carrying a specific device on their person. More specifically, the present invention relates to monitoring systems with acoustical devices and speech recognition that are capable of recognizing a patient's request for assistance and can automatically initiate a summons for help.

BACKGROUND OF THE INVENTION

Systems are known that monitor a resident within a home as part of a home monitoring system. One such system has been disclosed in U.S. Pat. No. 6,402,691 B1 entitled "In-Home Patient Monitoring System issued Jun. 11, 2002. These systems save costs by physiological testing of the person and transmitting that information to a remote monitoring location. In addition, these systems can include an automated call function. Questions can be asked relative to the resident's condition and medications. Another such system has been disclosed in U.S. patent application Ser. No. 10/956,681, filed Oct. 1, 2004. The '681 application has been assigned to the assignee hereof and is incorporated herein by reference.

Known systems rely upon the resident having the mobility to use the system. This includes answering any telephone query that is automatically generated on a periodic basis. In some cases, these queries can be less than daily depending on the condition of the resident and his/her medications.

In a home monitoring system, a resident is monitored for physiological and other conditions indicative of health and well-being. The physiological monitoring can include the person's vital signs such as weight, blood pressure, pulse rate and oxygen saturation. The system may also incorporate medication control to support the health and well-being of the resident.

In the event that the physiological monitoring determines that an emergency situation is prevalent or the physiological measurement is not completed as scheduled or the medication is not taken as prescribed, a call can be initiated to a remote monitoring facility to provide an alert. The remote monitoring facility can respond by calling the resident or patient or by visiting the person. However, the follow-up call may find that no one answers the phone and therefore a visit is scheduled for a later time.

The resident may not be answering the phone because he/she went outside, could not hear the phone ring, or was not able to respond. Other reasons for not being able to respond include, the person fell down and cannot get up, or, had an earlier emergency and is now incapacitated or unavailable at the scheduled time. Because the cause is not certain, a routine follow-up call may be made. It therefore becomes extremely important to initiate a call at the first sign of an abnormal situation. Otherwise, a person that falls could be down for a very long time and need assistance. The person might also miss vital medications or monitoring.

There are also systems wherein the resident carries a device that can be activated send a signal for help if he/she falls or become demobilized. However, these systems rely upon the person having the transmitting device on their person at the time of the emergency. It is possible if not likely that the resident will remove the device and forget to put it back on under certain circumstances such as bathing, sleeping, or changing clothing. This raises the potential that the resident may not be able to summon help when demobilized by falling or by other reasons.

Therefore, there exists a need for improved systems for summoning help in situations where time can be important to survival or relief of discomfort.

BRIEF DESCRIPTION OF THE DRAWINGS

FIG. 1 is a system in accordance with the invention; and

FIGS. 2A-2E taken together illustrate a process which can be carried out by the system of FIG. 1.

DETAILED DESCRIPTION OF THE INVENTION

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In systems that embody the invention, acoustic transducers can be located in primary regions of a home. These acoustic transducers can be connected to a computer or similar device that incorporates software and that can perform a speech recognition function.

The speech of a resident may be used for as a basis for programming a speech recognition function such that the resident's speech can be recognized while other ambient noise or sounds are present. Some ambient sounds can come from a radio or TV that is running. The resident can enter specific sounds, words or word phrases that will be recognized by the home monitoring system. Some of these words could include "help, or help me, or other words descriptive of the situation such as "it hurts, etc."

Instead of words, characteristics of the resident's speech could be programmed and recognized so that any high stress speech pattern will initiate a response. In addition, it is within the scope of this invention that the monitoring system could have control of the radio or TV and interrupt power or audio output from these devices if it recognizes the resident's speech. Different recognition techniques and methods can be used to identify a situation where the resident needs assistance.

In a residence, there may be a television or other source of sounds and voices that are not related to the patient's need for help. Speech recognition and system activation software may have problems determining if a stressful speech or sound is the patient's speech or a television or other audio system.

In order to distinguish the resident's speech from simultaneous, loud television or audio output, a sound transducer can be located at the output of these devices. The signals from these sound transducers can then be transmitted to the monitoring system wherein the software uses them to compensate the other sensors in the residence.

The transducers throughout the residence can each be compensated in software or hardware to minimize and cancel signals that relate to the television or other audio system. With this compensation, the transducers throughout the residence can have a high sensitivity to those sounds of interest. These would include the voice of the patient.

When the home monitoring system recognizes a situation that needs attention from the speech recognition, it automatically initiates a call to one or more preprogrammed remote locations to summon help. The message for help may include a speech recording of the resident describing the situation or the stored words that the system recognized for activating the automatic call for help.

The remote location can include a neighbor, a relative, a friend, or a central monitoring station having medical emergency response capabilities. The neighbor can be a very important person because of his/her close proximity to the resident and ability to respond in a very short time. The system may be configured such that it first calls certain locations and then calls others after some verification of the situation has been accomplished.

In an aspect of the invention, the system may relay messages from the remote location back to the resident or establish a two-way direct communication with the remote location. In this embodiment, speakers could be located strategically within the home. The resident can now have a dialog describing the situation through the transducers and speakers in the home.

In another aspect of the invention, the system could incorporate a verbal prompt to the resident to describe his/her situation in sufficient detail that it can determine the appropriate response and which locations to call first.

FIG. 1 illustrates a system 10 that embodies the invention. The system 10 includes control circuitry 12. Circuitry 12 can include a programmable processor 12$a$ and associated control software 12$b$.

Control circuitry 12 is linked via a wired or wireless medium (or both) 14 to a plurality of audio input transducers, for example microphones, 18 and a plurality of audio output transducers, for example loud speakers, 20. In one embodiment the respective input, output transducers 18$i$, 20$i$ could be packaged together in a single housing.

The input, output transducers such as 18$i$, 20$i$ can be located in various locations or rooms of a residence where the resident would be present at least from time to time. These could include, without limitation, living rooms, kitchens, bathrooms, bedrooms, halls and the like.

The circuitry 12 could also be linked, via a wired, or wireless medium 16 to one or more remote monitoring stations. Software 12$b$ can receive and initiate communications via medium 16.

Relative to the system 10, the acoustic input transducers, such as transducer 18$i$ can be located in heavily used regions of a home or residence. The processor 12$a$ and associated software 12$b$ can carry out a speech recognition function based on previously received speech of the resident of a region or home where the system 10 has been installed.

Characteristics of the resident's speech can be incorporated or stored in the voice recognition software, the control circuitry 12. Advantageously, receive high stress speech patterns from the resident can be recognized and can initiate communications via medium 16 to a remote monitoring location, which could include a neighbor's or relative's house as well as a monitoring facility.

The control circuitry 12 can communicate directly with the resident via medium 14 and the audio output transducers 20. In addition, the software 12$b$ can couple audio from the resident, via medium 14 to one or more remote locations via medium 16.

The audio input transducers 18 can be compensated to be able to distinguish a resident's speech from simultaneously present background audio such as from televisions, radios and the like all without limitation.

The ability to distinguish the voice of a resident from other sources of sounds within a residence is an important advantage of the system 10. A sound source such as a TV or RADIO can intermittently or continuously emit audio, such as A-T, A-R throughout the residence, see FIG. 1. Preferably an adjustment can be made to remove the sounds associated with sources other than the person in the residence.

The graphs of FIGS. 2A-2E illustrate a process for compensating the sensors 18 by measuring the sounds in the residence. The relationships, phases, and amplitudes of associated sound signals from each acoustical sensor, such as 18$i$, in the residence can then be stored by control circuitry 12.

FIG. 2A illustrates a signal 30 from an acoustical sensor such as 18$i$ positioned to receive audio, such as A-T or A-R, from a sound source such as a TV or from a RADIO. The signal 30 has an associated amplitude. This sound source will produce acoustical waves that travel throughout the residence and will be received by acoustical sensors 18 at various locations. These locations will have different distances relative to the source location.

As sound travels through the residence, it takes time due to its propagation rate. A corresponding signal will be produced at the other locations of acoustical sensors 18. Those signals will each have a different phase and amplitude. FIG. 2B illustrates a signal 32 from an acoustical sensor 18$j$ at another location within the residence. Signal 32 exhibits a phase shift and amplitude different than that of the signal 30 of FIG. 2A.

In a first step, the phase of the signal 32 in FIG. 2B is adjusted to match the signal 30 in FIG. 2A. This can be done by storing the signals in a memory of a processor 12$a$ for a period of time and then using the processor 12$a$ to shift one signal in time relative to the other such that the signals are crossing zero at the same time.

By using the zero crossings, the processor 12$a$ does not yet have to consider the amplitude. Once the phase shift has been measured, it is stored for use in compensating the signal 30 shown in FIG. 2A.

FIG. 2C illustrates adjusting the signal 32 of FIG. 2B so that it is now in phase with the source signal 30, FIG. 2A. This is in preparation for the next step which is to adjust the amplitude for the eventual cancellation of the non-resident sound source signals. In this case the two signals being compared have the same phase but not the same amplitude.

One approach is then to invert the signal, see signal 32", FIG. 2D, from the acoustical sensor 18$j$ at the location that produced signal 32, FIG. 2B and start adding the signals of FIG. 2A and FIG. 2D. If the result is non-zero, then the amplitude of the signal 32" in FIG. 2D is altered, increased in this example, such that the result of that processing is closer to zero.

Adjusting the amplitude of the signal 32" in FIG. 2D continues until the result is as close to zero as possible. When the amplitude signal 32" of FIG. 2D is the same as the amplitude of signal 32 of FIG. 2A, then adding them when they are out of phase as illustrated will result in a substantially zero amplitude signal as illustrated in FIG. 2E.

The phase and amplitude information can be stored in memory, for example, EEPROM and used to dynamically adjust all acoustical input sensors 18 whenever the sound source, such as the TV or RADIO, is turned ON.

Once the acoustical sensor signals such as the signal 32, from the location associated with FIG. 2B have been compensated for the sound source producing the signals at FIG. 2A, the system 10 will be capable of distinguishing the voice of the resident near this location.

This process will need to be repeated for each sound source such as TV, or RADIO in the residence that may interfere with the speech recognition of the system 10 due to signals received at each acoustical sensor location. The system processor 12$a$ can automatically make these individual adjustments for each monitored sound source present in the residence such that it can even compensate for more than one source being turned ON at a time.

The above described process is dynamic. A new sound source that is not associated with a resident's voice can be automatically responded to by the system 10 and compensation provided for it. The adjustment of each non-resident sound source can take place within seconds if it has not already been measured and recorded in the memory of the processor 12.

After the acoustic sensor signals are nulled within the system 10, then the sounds from the resident will produce signals at least at one acoustical sensor 18j and possibly multiple acoustical sensors in the residence. The system 10 can also use the amplitude of the signals at multiple acoustical sensors to help locate the resident within the residence. This can be accomplished using amplitude information and phase relationships of the signals from the respective acoustical input sensors 18. It will be understood that the above described steps can be altered without departing from the spirit and scope of the invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A system comprising:
    at least one sensor of a physiological condition of an individual;
    a plurality of audio input transducers distributed throughout a residence of the individual;
    at least one discrete, stationary background sound source within the residence with a first transducer of the plurality of transducers located at an output of the at least one discrete, stationary background sound source;
    control circuitry coupled to the sensor and the transducers, the control circuitry has a communications port, the control circuitry responds to speech received from the transducers and carries out a speech recognition process thereon, and in accordance with the results thereof, initiates communications with a displaced location via the communications port; and
    software executed by the control circuitry, the software compensates each of the plurality of input transducers to cancel background sounds from the at least one discrete, stationary background sound source and to null an acoustic signal from each of the plurality of input transducers based upon differences in phase and amplitude of the background sounds detected among each of the plurality of input transducers, the software executed by the control circuitry carrying out speech recognition of audio provided by the individual from the nulled acoustic signal provided by at least some of the plurality of input transducers, said nulling including detecting an acoustic signal from the at least one discrete, stationary background sound source through the first transducer and from each of at least two second transducers of the plurality of transducers, determining a phase difference between the acoustic signal detected by the first transducer and each of the at least two second transducers, adjusting a phase of the signal detected by the first transducer for each of the at least two second transducers based upon the phase difference of each of the respective second transducers, inverting each of the phase adjusted signals, adjusting an amplitude of the respective inverted signals and adding the respective phase and amplitude adjusted signals to the respective acoustic signal detected by the at least two second transducers to null the at least one discrete, stationary background sound source within the respective acoustic signals from the at least two second transducers.

2. A system as in claim 1 which includes an audio output transducer coupled to the control circuitry, the control circuitry provides at least one speech output to the audio output transducer.

3. A system as in claim 1 where the control circuitry provides one of a plurality of speech outputs to the audio output transducer.

4. A system as in claim 3 where the software selects at least one of the speech outputs in response to results of the speech recognition process.

5. A system as in claim 3 where the control circuitry couples speech signals from an audio input transducer of the plurality of transducers to the port for communications to the displaced location.

6. A system as in claim 5 where at least some communications received from the displaced location via the port are coupled by the control circuitry to the audio output transducer.

7. A system as in claim 1 where the control circuitry evaluates, at least in part, outputs from the at least one sensor.

8. A system as in claim 6 where the control circuitry evaluates, at least in part, outputs from the at least one sensor.

9. A system as in claim 1 which includes a sensor compensation function.

10. A monitoring system comprising:
    at least a first sensor for monitoring a physiological condition of a person and associated sensor interface circuitry;
    a plurality of acoustical input transducers for monitoring acoustical signals and associated transducer interface circuitry distributed throughout a residence of the person;
    at least one discrete, stationary background noise source within the residence with a first transducer of the plurality of acoustic input transducers located at an output of the at least one discrete, stationary background noise source;
    a device that receives at least first sensor data and which receives data from the transducers and respective interface circuitry, to carry out at least a speech recognition function, and responsive thereto, to initiate communications with a displaced unit; and
    control software executed by the device, the software compensates each of the plurality of input transducers to cancel background sounds from the at least one discrete, stationary sound source and to null an acoustic signal from each of the plurality of input transducers based upon differences in phase and amplitude of the background sounds detected between the first input transducer and each of at least two other input transducers of the plurality of input transducers said canceling including inverting a signal received through the first input transducer of the plurality of input transducers for each of the at least two other input transducers, adjusting an amplitude and phase of the inverted signals based upon the respective detected difference in phase and amplitude and adding the respective inverted and adjusted signals to a signal from the respective at least two input transducers the software executed by the device carrying out speech recognition on audio provided by the person from the nulled acoustic signal provided by the at least two input transducers.

11. A system as in claim 10 where the speech recognition function includes recognizing at least one of spoken words or sounds indicative of a condition needing attention.

12. A system as in claim 11 including a plurality of acoustic output transducers to provide output audio information to a person regarding the recognition of a message by the speech recognition function.

13. A system as in claim 10 which includes circuitry to transfer to the remote unit at least in part a recording of speech of a person indicating or describing an ongoing condition.

14. A system as in claim 10 where the speech recognition function recognizes members of a plurality of condition describing words.

15. A system as in claim 10 where the remote unit comprises a bi-directional verbal communications device.

16. A system as in claim 10 which also includes an intercom system.

17. A system as in claim 10 which also includes a video system.

18. A system as in claim 10 which includes at least one audible output transducer.

19. A system as in claim 18 wherein the device, in combination with the audible output transducer, provide local audible feedback.

20. A system as in claim 19 which includes a plurality of acoustical input transducers coupled to the device.

21. A system as in claim 19 where at least some of the input transducers have associated therewith a respective audible output transducer.

22. A system as in claim 19 where the input transducers are coupled to the device by one of a wired, or a wireless link.

23. A system as in claim 19 where the device includes a programmable processor and associated voice recognition software.

24. A system as in claim 12 wherein the control software provides the output audio information.

25. A system as in claim 24 where the device includes a programmable processor and associated voice recognition software.

26. A system as in claim 10 which includes circuitry to compensate at least some of the acoustic input transducers.

27. A system as in claim 24 which includes a digital signal processor coupled to the control software.

28. A system as in claim 25 wherein the control software pre-stores background sound indicia.

29. A system as in claim 10 which includes circuitry to compensate at least some of the acoustic input transducers to reduce interference noise signals not associated with selected speech.

30. A system as in claim 29 where signals from at least some of the acoustic input transducers associated with the interference noise signals are coupled to the circuitry to compensate.

31. A system as in claim 1 which includes a plurality of audio input transducers locatable throughout an area to be monitored.

32. A system as in claim 31 in which at least one of the plurality of audio input transducers is located proximate a local source of ambient background sound where the at least one audio input transducer is compensated to minimize the ambient background sound generated from the source.

33. A method comprising:
   providing a plurality of audio input transducers located in an area to be monitored;
   providing at least one discrete, stationary sound source within the area with a first of the plurality of audio input transducers located at an output of the at least one discrete, stationary sound source;
   detecting audio received from the area;
   nulling simultaneous ambient background audio from the at least one discrete, stationary sound source within the detected audio of an acoustic signal from at least two other of the plurality of audio input transducers by detecting a difference in phase and amplitude between a signal from the first transducer and a respective signal from at least two other input transducers of the plurality of transducers, inverting a signal received through the first transducer, adjusting an amplitude and phase of the inverted signal based upon the detected differences in phase and amplitude for each of the at least two other input transducers and adding the respective inverted and adjusted signal to a respective signal from the at least two other transducers;
   locally performing speech recognition on the detected audio with nulled ambient background audio from at least some of the plurality of input transducers to distinguish a resident's speech from simultaneous ambient local background audio from the at least one discrete, stationary sound source;
   selecting at least one speech output in response to the results of the speech recognition;
   coupling speech signals from the at least some audio input transducer to a communications port;
   transmitting a signal from the communications port to at least one remote location, the signal conveying information concerning the resident.

34. A method as in claim 33 which includes relaying a signal from the at least one remote location back to the communication port.

35. A method as in claim 34 which includes coupling at least some of the signal received from the remote location to an audio output transducer.

36. A method as in claim 33 which includes compensating the at least one audio input transducer.

37. A method as in claim 33 which includes evaluating, at least in part, outputs from at least one sensor.

38. A method as in claim 33 which includes storing the resident's speech local to voice recognition software.

39. A method as in claim 33 which includes recognizing at least one spoken word or sound to be indicative of a condition needing attention.

40. A method as in claim 33 which includes recognizing members of a plurality of condition describing words.

* * * * *